United States Patent
Ito

(10) Patent No.: US 9,688,865 B2
(45) Date of Patent: Jun. 27, 2017

(54) LIQUID COMPOSITION, PIGMENT DISPERSION LIQUID, AND AQUEOUS INK COMPOSITION FOR INK JET RECORDING

(71) Applicant: Seiko Epson Corporation, Tokyo (JP)

(72) Inventor: Hiroshi Ito, Matsumoto (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 15/082,213

(22) Filed: Mar. 28, 2016

(65) Prior Publication Data

US 2016/0289460 A1 Oct. 6, 2016

(30) Foreign Application Priority Data

Apr. 1, 2015 (JP) .................. 2015-074878

(51) Int. Cl.
| | | |
|---|---|---|
| *C09D 11/322* | (2014.01) | |
| *C09D 5/14* | (2006.01) | |
| *C09D 11/326* | (2014.01) | |
| *C09D 11/38* | (2014.01) | |

(52) U.S. Cl.
CPC .............. *C09D 5/14* (2013.01); *C09D 11/322* (2013.01); *C09D 11/326* (2013.01); *C09D 11/38* (2013.01)

(58) Field of Classification Search
CPC .................................................. C09D 11/322
See application file for complete search history.

(56) References Cited

U.S. PATENT DOCUMENTS

| | | |
|---|---|---|
| 2003/0058318 A1 | 3/2003 | Sago et al. |
| 2007/0219291 A1 | 9/2007 | Doi et al. |

FOREIGN PATENT DOCUMENTS

| | | | |
|---|---|---|---|
| JP | 2002-256198 A | | 9/2002 |
| JP | 2003-183558 A | | 7/2003 |
| JP | 2006274024 A | * | 10/2006 |
| JP | 2007-254502 A | | 10/2007 |
| JP | 2010-222417 A | | 10/2010 |
| JP | 2011-046624 A | | 3/2011 |

OTHER PUBLICATIONS

Machine English Translation of JP 2006-274024.*

* cited by examiner

*Primary Examiner* — Veronica F Faison
(74) *Attorney, Agent, or Firm* — Harness, Dickey & Pierce, P.L.C.

(57) ABSTRACT

Provided is a liquid composition containing a first solvent that is a polyol compound which has a distribution coefficient of water-octanol in a range of 0.0 to 2.5, and has three or more hydroxyl groups; a second solvent that is an organic solvent having a distribution coefficient of water-octanol which is in a range of −1.0 to 1.0; water; and a coloring material, in which the content of the first solvent is in a range of 0.005 mass % to 0.5 mass %, and the content of the second solvent is in a range of 0.5 mass % to 15 mass %.

20 Claims, No Drawings

LIQUID COMPOSITION, PIGMENT DISPERSION LIQUID, AND AQUEOUS INK COMPOSITION FOR INK JET RECORDING

BACKGROUND

1. Technical Field

The present invention relates to a liquid composition, a pigment dispersion liquid containing the liquid composition, and an aqueous ink composition for ink jet recording.

2. Related Art

Since an ink jet recording method is performed using a relatively simple device and is capable of recording a high definition image, rapid development thereof has been achieved in various fields. However, in a case of the aqueous ink composition (hereinafter, simply referred to as "ink"), microscopic organisms may be propagated during storage. If the microscopic organisms are propagated in the ink, it is likely that pH of ink is decreased, sedimentation of the ink component occurs, and deterioration of the ink or clogging of a nozzle occurs. In order to solve these problems, various studies for antiseptic properties of the ink have been conducted.

For example, JP-A-2011-46624 discloses that 1,2-benzisothiazolin-3-one is used as an antiseptic and antibacterial agent which is used for the liquid composition. In addition, for example, JP-A-2003-183558 discloses that Proxel XL2S is mixed into an aqueous pigment ink for ink jet as an antiseptic and antifungal agent. Further, JPA-2010-222417 discloses an aqueous ink composition which is obtained by heating a pigment dispersion liquid which contains sodium benzoate and the like as an antiseptic agent and an antifungal agent, and a glycerin ether compound as a humectant.

However, the antiseptic and antifungal agent has biocidal activity, and thus, in a case where a label printing and a textile printing are performed by using the ink containing the antiseptic and antifungal agent, skin sensitivity may be caused depending on how the ink was treated when a printed matter comes into contact with the skin. For example, since the minimum inhibitory concentration is in a range of several tens of ppm to several hundreds of ppm with respect to microscopic organisms of the antiseptic and antifungal agent, the concentration at the time of adding the ink is approximately 500 ppm at most, and the safety of ink itself is high. However, the antiseptic and antifungal agent is concentrated on the printed surface after the liquid component is separated through the printing, and thus, the concentration becomes 10 to 20 times greater as compared with the case of adding the ink.

In addition, the antiseptic and antifungal agent has low volatility for retaining the antiseptic properties and low redissolvability after being dried, and thus, is likely to remain on the printed surface. Accordingly, for example, in a case where a printing base material is formed of a film, the concentration of the antiseptic agent on the printed surface is likely to be high, and in a case of handling the printed matter which is obtained by performing label printing or textile printing, the ink easily comes into contact with the skin, and thus, for the purpose of the above operations, there is a risk of an allergic reaction of contact dermatitis being caused due to skin sensitivity. Therefore, ink with high safety has been required.

Further, the glycerin ether compound which is mixed in JP-A-2010-222417 has a high distribution coefficient of water-octanol, and is a water-insoluble compound, and thus, the glycerin ether compound is easily separated from the liquid composition. For this reason, if the glycerin ether compound which is mixed in JP-A-2010-222417 is used, ink stability may not be obtained at a low temperature, or ink discharge may not be stable. Thus, if a glycerin ether compound having a low distribution coefficient of water-octanol is used, there is a possibility that an effect as the antiseptic agent cannot be obtained.

SUMMARY

An advantage of some aspects of the invention is to provide a liquid composition which is safe without posing the risk of causing skin sensitivity, is excellent in antiseptic performance, and has stability.

The invention can be realized in the following aspects or application examples.

Application Example 1

According to an aspect of the invention, there is provided a liquid composition containing a first solvent that is a polyol compound which has a distribution coefficient of water-octanol in a range of 0.0 to 2.5, and has three or more hydroxyl groups; a second solvent that is an organic solvent having a distribution coefficient of water-octanol which is in a range of −1.0 to 1.0; water; and a coloring material, in which the content of the first solvent is in a range of 0.005 mass % to 0.5 mass %, and the content of the second solvent is in a range of 0.5 mass % to 15 mass %.

According to the liquid composition in Application Example 1, it is possible to provide the liquid composition which is safe without posing the risk of causing skin sensitivity, is excellent in antiseptic performance, and has stability.

Application Example 2

In the liquid composition according to Application Example 1, the polyol compound may be at least one selected from the group consisting of a triol compound and a derivative thereof.

Application Example 3

In the liquid composition according to Application Example 1 or, the polyol compound may be at least one selected from the group consisting of heptanoic acid 3-hydroxy-2,2-bis (hydroxymethyl) propyl, pentaerythritol caprylate, sorbitan monocaprate, ditrimethylolpropane, and tritrimethylolpropane.

Application Example 4

In the liquid composition according to any one of Application Examples 1 to 4, the second solvent may be at least one selected from the group consisting of 1,2-alkyl diols and glycol ethers.

Application Example 5

In the liquid composition according to Application Example 4, the 1,2-alkyl diols may be at least one selected from the group consisting of 1,2-butanediol, 3,3-dimethyl butane-1,2-diol, 1,2-pentanediol, 1,2-hexanediol, and 1,2-heptanediol.

Application Example 6

In the liquid composition according to Application Example 4 or 5, the glycol ethers may be at least one selected from the group consisting of ethyltriglycol, dipropylene glycol monomethyl ether, butyltriglycol, butyldiglycol, and dipropylene glycol monopropyl ether.

Application Example 7

In the liquid composition according to any one of Application Examples 1 to 6, the content of the water may be equal to or greater than 40 mass %.

Application Example 8

According to another aspect of the invention, there is provided a pigment dispersion liquid containing the liquid composition according to any one of Application Examples 1 to 7.

Application Example 9

According to still another aspect of the invention, there is provided an aqueous ink composition for ink jet recording containing the liquid composition according to any one of Application Examples 1 to 7.

DESCRIPTION OF EXEMPLARY EMBODIMENTS

Hereinafter, the preferred embodiments of the invention will be described. The embodiments described below are intended to describe examples of the invention. In addition, the invention is not limited to the following embodiments, but includes various modification examples employed in the scope without changing the gist of the invention. Note that, not all of the configurations described below are the essential configuration of the present invention.

1. Liquid Composition

A liquid composition according to an embodiment of the invention which is used as a raw material liquid of a pigment dispersion liquid for ink jet recording and an aqueous ink composition (hereinafter, referred to as "ink") contains a first solvent that is a polyol compound which has a distribution coefficient of water-octanol in a range of 0.0 to 2.5, and has three or more hydroxyl groups, a second solvent that is an organic solvent having a distribution coefficient of water-octanol which is in a range of −1.0 to 1.0; water; a coloring material, in which a content of the first solvent is in a range of 0.005 mass % to 0.5 mass %, and a content of the second solvent is in a range of 0.5 mass % to 15 mass %. Hereinafter, each component contained in the liquid composition according to the embodiment will be described.

1.1. First Solvent

The liquid composition according to the embodiment contains a polyol compound which has a distribution coefficient of water-octanol in a range of 0.0 to 2.5, and has three or more hydroxyl groups, as the first solvent, and the content of the first solvent is in a range of 0.005 mass % to 0.5 mass %.

The polyol compound which is used as the first solvent, which has the distribution coefficient of water-octanol in the range of 0.0 to 2.5, and has three or more hydroxyl groups is used in food additives and cosmetics and is known as a solvent which does not cause skin sensitivity, and for example, it has antibacterial activity with respect to bacteria such as *Escherichia coli* and *Pseudomonas aeruginosa*, and has antifungal activity with respect to fungi such as *Aspergillus oryzae* and *Penicillium funiculosum*. For this reason, the liquid composition containing the first solvent according to the embodiment can sufficiently secure the antiseptic performance of the liquid composition without adding an antibacterial agent having biocidal activity or an antifungal agent as in the related art, and thus, the liquid composition is safe without posing the risk of causing skin sensitivity, and is excellent in the antiseptic performance.

In addition, the polyol compound which has the distribution coefficient of water-octanol in the range of 0.0 to 2.5, and has three or more hydroxyl groups is compatible with water due to the three or more hydroxyl groups, and thus in combination with the second solvent described below, it is possible to secure the stability of a liquid composition, and particularly, low-temperature stability.

Here, the distribution coefficient of water-octanol, that is, a log P value represents a value which is defined by OECD Test Guideline 107. As the log P value is high, hydrophobicity is high, and as the log P value is low, hydrophilicity is high.

In the liquid composition according to the embodiment, the log P value of the polyol compound having three or more hydroxyl groups is in a range of 0.0 to 2.5, is preferably in a range of 0.2 to 2.4, and is particularly preferably in a range of 0.4 to 2.3. When the log P value of the polyol compound is within the above range, it is possible to sufficiently secure the antiseptic performance of the liquid composition.

The polyol compound having three or more hydroxyl groups which has a distribution coefficient of water-octanol is in a range of 0.0 to 2.5 is not particularly limited; however, examples thereof include heptanoic acid 3-hydroxy-2,2-bis (hydroxymethyl) propyl having three hydroxyl groups (log P: 0.46), pentaerythritol caprylate (log P: 2.29), sorbitan monocaprate (log P: 2.34), ditrimethylolpropane having four hydroxyl group (log P: 0.21), and tritrimethylolpropane having five hydroxyl groups (log P: 0.97). These solvents may be used alone or in combination with two or more types thereof. Among them, pentaerythritol caprylate and tritrimethylolpropane can secure antibacterial properties and antifungal properties with small amount thereof, and thus are particularly preferable.

A content of the first solvent is in a range of 0.005 mass % to 0.5 mass % with respect to the total mass of the liquid composition. An upper limit value is preferably equal to or less than 0.1 mass % in terms of compatibility with the second solution. When the content of the first solvent is within the above range, the antibacterial properties and antifungal properties can be secured.

1.2. Second Solvent

The liquid composition according to the embodiment contains an organic solvent having the distribution coefficient of water-octanol which is in a range of −1.0 to 1.0, as the second solvent, and a content of the second solvent is in a range of 0.5 mass % to 15 mass %.

In the liquid composition according to the embodiment, the polyol compound which is used as the first solvent, which has the distribution coefficient of water-octanol in the range of 0.0 to 2.5, and has three or more hydroxyl groups is compatible with water due to the three or more hydroxyl groups. However, the polyol compound has the relatively high log P value, and thus hydrophobicity is high. For this reason, separation of oil droplets is likely to occur in the liquid composition having a large amount of moisture, and thus it is difficult to obtain the stability of the liquid composition. In this regard, in the liquid composition according to the embodiment, it is possible to secure the stability of the liquid composition by additionally containing the second solvent having the lower log P value than that of the polyol compound which is used as the first solvent so as to be compatible with the first solvent. With this, the liquid composition according to the embodiment can sufficiently secure the antibacterial properties and antifungal properties of the liquid composition without adding an antibacterial agent having a biocidal activity or an antifungal agent in the related art, and secure the stability of the liquid composition, particularly, the low temperature stability.

In addition, in terms of discharge stability, the ink composition for ink jet recording which preferably has relatively low viscosity tends to have a relatively large amount of moisture, and the stability of a hydrophobic component is deteriorated, thereby deteriorating the discharge stability; whereas an aqueous ink composition for ink jet recording which uses the liquid composition according to the embodiment contains the above-described second solvent, and thus dissolution stability of the first solvent having high hydrophobicity is improved. With this, the aqueous ink composition for ink jet recording which uses the liquid composition according to the embodiment can prevent the occurrence of nozzle clogging due to the fact that the first solvent is precipitated as a foreign matter, and can secure the discharge stability.

In the liquid composition according to the embodiment, a log P value of the organic solvent which is used as the second solvent is in a range of −1.0 to 1.0, and is preferably in a range of −0.75 to 0.85. When the log P value of the organic solvent which is used as the second solvent is within the above range, compatibility with the first solvent is high, and thus it is possible to secure the stability of the liquid composition. In a case where the log P value thereof is lower than −0.75, the compatibility with the first solvent is low, and thus it is not possible to secure the stability of the liquid composition.

In the liquid composition according to the embodiment, the organic solvent which is used as the second solvent is preferably at least one selected from the group consisting of 1,2-alkyl diols and glycol ethers. In this case, a structure of the polyol compound which is used as the first solvent is similar to a structure of the organic solvent, and thus it is possible to secure the stability of the liquid composition by allowing the organic solvent to be compatible with the first solvent.

The 1,2-alkyl diols having the distribution coefficient of water-octanol which is in a range of −1.0 to 1.0 is not particularly limited; however, examples thereof include 1,2-butanediol (log P: −0.34), 3,3-dimethylbutane-1,2-diol (log P: −0.11), 1,2-pentane diol (log P: 0.01), 1,2-hexanediol (log P: 0.70), and 1,2-heptane diol (log P: 1.0). These solvents may be used alone or used in a combination with two or more thereof, or may be used in a combination with the glyceryl mono-substituted compounds. Among them, 1,2-hexanediol can secure the stability of the liquid composition with small amount thereof, and thus is particularly preferable.

The glycol ethers having the distribution coefficient of water-octanol which is in a range of −1.0 to 1.0 is not particularly limited; however, examples thereof include ethyl triglycol (log P: −0.98), dipropylene glycol monomethyl ether (log P: −0.46), butyl triglycol (log P: 0.02), butyldiglycol (log P: 0.56), and dipropylene glycol monopropyl ether (log P: 0.60). These solvents may be used alone or used in combination with two or more thereof. Among them, butyltriglycol can secure the stability of the liquid composition with small amount thereof, and thus is particularly preferable.

A content of the second solvent can be determined by comprehensively considering the degree of hydrophobicity and the content of the first solvent. However, the content thereof is in a range of 0.5 mass % to 15 mass %, is preferably in a range of 1 mass % to 10 mass %, is more preferably in a range of 3 mass % to 9 mass %, and is particularly preferably in a range of 5 mass % to 8 mass % with respect to the total mass of the liquid composition. In a case where the content of the second solvent is within the above range, dissolution stability of the first solvent is improved and the stability of the liquid composition can be secured.

1.3. Coloring Material

The liquid composition according to the embodiment contains a coloring material. A pigment and a dye can be used as the coloring material.

Examples of the pigment include an inorganic pigment and an organic pigment. The inorganic pigment is not particularly limited; however, examples thereof include carbon blacks (C.I. PIGMENT black 7) such as furnace black, lamp black, acetylene black, and channel black, iron oxide, titanium oxide, zinc oxide, and silica.

The organic pigment is not particularly limited; however, examples thereof include a quinacridone pigment, a quinacridonequinone pigment, a dioxazine pigment, a phthalocyanine pigment, an anthrapyrimidine pigment, an anthanthrone pigment, an indanthrone pigment, a flavanthrone pigment, a perylene pigment, a diketopyrrolopyrrole pigment, a perinone pigment, a quinophthalone pigment, an anthraquinone pigment, a thioindigo pigment, a benzimidazolone pigment, an isoindolinone pigment, an azomethine pigment, and an azo pigment.

The above-described pigment may be used by being dispersed with a dispersant which is selected from a water-soluble resin, a water-dispersible resin, and a surfactant, or may be used as a self-dispersed pigment by oxidizing or sulfonating the surface of the pigment with ozone, a hypochlorous acid, oleum, and the like. The pigment may be used alone or in combination of two or more types thereof.

The dye is not particularly limited; however, examples thereof include a water soluble dye such as an acidic dye, a direct dye, a reactive dye, and a basic dye, a water dispersion dye such as a dispersion dye and oil soluble dye. More specifically, examples of the acidic dye include C.I. acid yellow 17, 23, 42, 44, 79, and 142, C.I. acid red 52, 80, 82, 249, 254, and 289, C.I. acid blue 9, 45, and 249, and C.I. acid black 1, 2, 24, and 94, examples of the direct dye include C.I. direct yellow 1, 12, 24, 33, 50, 55, 58, 86, 132, 142, 144, and 173, C.I. direct red 1, 4, 9, 80, 81, 225, and 227, C.I. direct blue 1, 2, 15, 71, 86, 87, 98, 165, 199, and 202, C.I. direct black 19, 38, 51, 71, 154, 168, and 195, and C.I. direct blue 2, 3, 8, 10, 12, 31, 35, 63, 116, 130, 149, 199, 230, and 231, examples of the reactive dye include C.I. reactive yellow 2, 7, 15, 22, 37, 42, 57, 69, 76, 81, 95, 102, 125, and 135, C.I. reactive red 2, 14, 24, 32, 55, 79, 106, 111, and 124, C.I. reactive blue 2, 13, 21, 38, 41, 50, 69, 72, 109, 120, and 143, and C.I. reactive black 3, 4, 5, 8, 13, 14, 31, 34, 35, and 39, examples of the basic dye include C.I. basic yellow 1, 2, 13, 19, 21, 25, 32, 36, 40, and 51, C.I. basic red 1, 5, 12, 19, 22, 29, 37, 39, and 92, C.I. basic blue 1, 3, 9, 11, 16, 17, 24, 28, 41, 45, 54, 65, and 66, and C.I. basic black 2 and 8, examples of the dispersion dye include C.I. disperse red 60, 82, 86, 86:1, 167:1, and 279, C.I. disperse yellow 64, 71, 86, 114, 153, 233, and 245, C.I. disperse blue 27, 60, 73, 77, 77:1, 87, 257, and 367, C.I. disperse violate 26, 33, 36, and 57, and C.I. disperse orange 30, 41, and 61, examples of oil soluble dye include C.I. solvent yellow 16, 21, 25, 29, 33, 51, 56, 82, 88, 89, 150, and 163, C.I. solvent red 7, 8, 18, 24, 27, 49, 109, 122, 125, 127, 130, 132, 135, 218, 225, and 230, C.I. solvent blue 14, 25, 35, 38, 48, 67, 68, 70, and 132, and C.I. solvent black 3, 5, 7, 27, 28, 29, and 34.

The dye may be used alone or in combination with two or more types thereof. Further, the dye and the pigment may be used by being mixed with each other.

A content of the coloring material can be properly adjusted in accordance with the purpose thereof; however, it is preferably in a range of 0.10 mass % to 20.0 mass %, is more preferably in a range of 0.20 mass % to 15.0 mass %, and is still more preferably in a range of 1.0 mass % to 10.0 mass %.

1.4. Water

The liquid composition according to the embodiment includes water. Examples of water include pure water such as ion exchange water, ultrafiltration water, reverse osmosis water, and distilled water, and ultrapure water obtained by removing as many ionic impurities as possible. In addition, if water which is sterilized by being irradiated with ultraviolet light, or to which hydrogen peroxide is added, is used, it is possible to prevent the growth of bacteria or fungi when the liquid composition is stored for a long period of time.

A content of water is preferably equal to or greater than 40 mass %, is more preferably equal to or greater than 45 mass %, and still more preferably equal to or greater than 50 mass %, with respect to the total mass of the liquid composition. When the content of water is equal to or greater than 40 mass %, the liquid composition has relatively low viscosity. In addition, when the content of water is equal to or greater than 40 mass %, there is a tendency that solubility of the first solvent which is a hydrophobic component is deteriorated; however, the liquid composition contains the second solvent, and thus the compatibility with the first solvent is improved, thereby improving the stability of the liquid composition is improved. In addition, an upper limit of the content of water is preferably equal to or less than 90 mass %, is more preferably equal to or less than 85 mass %, and is still more preferably equal to or less than 80 mass %, with respect to the total mass of the liquid composition.

1.5. Humectant

The liquid composition according to the embodiment may further contain a humectant. The humectant is not particularly limited, as long as it can be generally used for the ink composition for ink jet recording. The standard boiling point of the humectant is preferably equal to or greater than 180° C., in a case where the liquid composition uses an evaporation drying type ink, the standard boiling point is more preferably in a range of 180° C. to 250° C., and in a case where the liquid composition uses a penetration-drying type ink, the boiling point is still more preferably equal to or greater than 200° C. When the standard boiling point is within the above range, it is possible to impart excellent water retention properties and wettability to the ink composition.

The humectant is not particularly limited; however, examples thereof include ethylene glycol, propylene glycol, diethylene glycol, triethylene glycol, tetraethylene glycol, pentamethylene glycol, trimethylene glycol, 2-butene-1,4-diol, 2-ethyl-1,3-hexanediol, 2-methyl-2,4-pentanediol, and tripropylene glycol, polyols having a number average molecular weight of 2000 or less such as polyethylene glycol, 1,3-propylene glycol, isopropylene glycol, isobutylene glycol, glycerol, diglycerol, meso-erythritol, trimethylolpropane, pentaerythritol, dipentaerythritol, lactams such as 2-pyrrolidone, N-methyl-2-pyrrolidone, ε-caprolactam, and hydroxyethyl pyrrolidone, urea derivatives such as urea, thiourea, ethylene urea, 1,3-dimethyl imidazolidinones, monosaccharides such as glucose, mannose, fructose, ribose, xylose, arabinose, galactose, an aldonic acid, glucitol (sorbitol), maltose, cellobiose, lactose, sucrose, trehalose, and maltotriose, disaccharides, oligosaccharides, polysaccharides, and derivatives of these saccharides, and betaines such as glycine and trimethyl glycine. Among them, it is particularly preferable to use propylene glycol, glycerin, trimethylolpropane.

The humectant may be used alone or in combination with two or more types thereof.

A content of the humectant can be properly adjusted in accordance with the purpose thereof; however, the content thereof is preferably in a range of 2.5 mass % to 30 mass %, is more preferably in a range of 5.0 mass % to 25 mass %, and is still more preferably in a range of 10 mass % to 20 mass %, with respect to the total amount of the ink using the liquid composition according to the embodiment.

1.6. Surface Tension Adjusting Agent

The liquid composition according to the embodiment may further contain a surface tension adjusting agent. The surface tension adjusting agent is used for adjusting the wettability of the ink with respect to a printing base material, a discharge passage, and a discharge head by reducing the surface tension at the time of water dissolution, and is selected from a water soluble solvent and a surfactant which have low surface tension.

The water soluble solvent having low surface tension is not particularly limited; however, examples thereof include lower alcohols such as ethanol, propanol, and butanol, butylene glycol, diols such as 1,3-pentanediol, 2-ethyl-1,3-propanediol, and 1,6-hexane diol, and glycol monoethers such as ethylene glycol monomethyl ether, ethylene glycol monoethyl ether, diethylene glycol monomethyl ether, diethylene glycol monoethyl ether, and propylene glycol monomethyl ether. The surfactant is not particularly limited; however, for example, it is possible to properly select from a nonionic surfactant, an anionic surfactant, a cationic surfactant, and an amphoteric surfactant. Particularly, it is preferable to use an acetylene glycol surfactant and a silicone surfactant which has high surface activity and less foaming properties.

The acetylene glycol surfactant is not particularly limited; however, examples thereof include OLFINE E1004, E1010, E1020, PD-001, PD-002W, PD-004, PD-005, EXP.4200, EXP.4123, EXP.4300 ((product name) which are manufactured by Nissin Chemical Industry Co., Ltd.), SURFYNOL 440, 465, 485, CT111, CT121, TG, GA, DYNOL 604, 607, OLFINE 104 series and E series such as OLFINE E1010 ((product name) which are manufactured by Air Products Japan, Inc.)), ACETYLENOL E40, E60, and E100 ((product name) which are manufactured by Kawaken Fine Chemicals Company Ltd.). The acetylene glycol surfactant may be used alone or in combination with two or more types thereof.

Examples of the silicone surfactant include a polysiloxane compound and polyether-modified organosiloxane. Commercially available products of the silicone surfactant are not particularly limited; however, examples thereof include BYK-306, BYK-307, BYK-333, BYK-341, BYK-345, BYK-346, BYK-347, BYK-348, and BYK-349 ((product name) which are manufactured by BYK Japan KK), KF-351A, KF-352A, KF-353, KF-354L, KF-355A, KF-615A, KF-945, KF-640, KF-642, KF-643, KF-6020, X-22-4515, KF-6011, and KF-6012, ((product name) which are manufactured by Shin-Etsu Chemical Co., Ltd.), SILFACE SAG002, 005, 503A, and 008 ((product name) which are manufactured by Nissin Chemical Industry Co., Ltd).

A content of the surface tension adjusting agent is preferably in a range of 0.10 mass % to 2.5 mass %, is more preferably in a range of 0.25 mass % to 1.5 mass %, and is particularly preferably in a range of 0.50 mass % to 1.25 mass %, with respect to the total amount of the ink using the liquid composition according to the embodiment. When the content of surface tension adjusting agent is within the above range, it is possible to properly adjust the wettability of the ink using the liquid composition with respect to a recording medium.

1.7. pH Adjusting Agent

The liquid composition according to the embodiment may further contain a pH adjusting agent so as to adjust pH of ink. The pH adjusting agent is not particularly limited; however, examples thereof include, an inorganic acid such as a sulfuric acid, a hydrochloric acid, and a nitric acid, an inorganic base such as lithium hydroxide, sodium hydroxide, potassium hydroxide, and ammonia, an organic base such as triethanolamine, diethanolamine, monoethanolamine, triisopropanolamine, diisopropanolamine, and trishydroxymethyl aminomethane, and an organic acid such as an adipic acid, a citric acid, a succinic acid, and a lactic acid.

The pH adjusting agent may be used alone or in combination with two or more types thereof.

A content of the pH adjusting agent can be properly adjusted in accordance with the purpose of use; however, it is possible to add the pH adjusting agent such that pH of the ink is preferably in a range of 6.5 to 10.5, and is more preferably in a range of 7.0 to 9.5.

1.8. Fixing Resin

The liquid composition according to the embodiment may contain a fixing resin. The fixing resin is added when the coloring material is mainly formed of a pigment, is used to improve the fixability of the pigment with respect to the recording medium.

The fixing resin is not particularly limited; however, for example, a water soluble resin and a water-dispersible resin can be used. Specific examples thereof include an acrylic polymer such as a polyacrylic acid ester or a copolymer thereof, a polymethacrylic acid ester or a copolymer thereof, polyacrylonitrile or a copolymer thereof, polycyanoacrylate, polyacrylamide, a polyacrylic acid, and a polymethacrylic acid. Examples of a polyolefin polymer include polyethylene, polypropylene, polybutene, polyisobutylene, polystyrene or a copolymer thereof, a petroleum resin, a coumarone-indene resin, and a terpene resin. Examples of a vinyl acetate-vinyl alcohol polymer include polyvinyl acetate or a copolymer thereof, polyvinyl alcohol, polyvinyl acetal, and polyvinyl ether. Examples of a halogen-containing polymer include polyvinyl chloride or a copolymer thereof, and polyvinylidene chloride. Examples of a nitrogen-containing vinyl polymer include polyvinylcarbazole, polyvinylpyrrolidone or a copolymer thereof, polyvinyl pyridine, and polyvinyl imidazole. Examples of a diene polymer include polybutadiene or a copolymer thereof, polychloroprene, and polyisoprene, (butyl rubber). In addition, it is possible to use other components such as a ring-opening polymerization type resin, a condensation polymerization type resin, and a natural polymer.

The fixing resin may be used alone or in combination with two or more types thereof.

A content of the fixing resin can be properly adjusted in accordance with the purpose thereof is preferably in a range of 1.5 mass % to 5 mass % with respect to the total mass of the liquid composition. When the content of the fixing resin is within the above range, the adhesion of the pigment is improved with respect to the recording medium.

1.9. Other Components

It is possible to appropriately add various additives such as a dissolution aid, a viscosity adjusting agent, an antioxidant, and a chelating agent for capturing metal ions which affect dispersion to the liquid composition according to the embodiment in order to maintain the storage stability and the stability of ink discharge from a head in an excellent state, and prevent the clogging of the nozzle or deterioration of the liquid composition.

1.10. Preparing Method of Liquid Composition

It is possible to prepare the liquid composition according to the embodiment by mixing the above-described components. The mixing method is not particularly limited, and it is possible to use a known method in the related art. In addition, the pigment dispersion liquid for ink jet recording and the aqueous ink composition recording according to the embodiment may use the above-described liquid compositions as they are, or may be prepared by properly adding and mixing water, a solvent, or other additives into the liquid composition.

1.11. Usage

As described above, the liquid composition according to the embodiment is used as a pigment dispersion liquid for ink jet recording and an aqueous ink composition by using the above-described liquid compositions as they are, or by properly adding and mixing water, the solvent, or other additives into the liquid composition. In addition, the aqueous ink composition for ink jet recording according to the embodiment can be used for various recording media, for example, it is used for fabric such as cotton, silk, polyester, polyurethane, and nylon which have high ink abortion, inkjet paper, high-quality paper and copy paper which have moderate ink abortion, and coated paper or a plastic film which have low ink absorption or non-absorption.

The recording medium having low absorption is not particularly limited; however, examples thereof include coated paper on which a coated layer obtained by applying a coating material onto the surface is provided. The coated paper is not particularly limited; however, examples thereof include printing paper such as art paper, coated paper, and matte paper.

The recording medium having non-absorption is not particularly limited; however, examples thereof include a recording medium in which a base material such as a plastic film and paper which do not include an ink absorbing layer is coated with plastic, and a recording medium to which the plastic film is adhered. Examples of the plastic referred in the embodiment include polyvinyl chloride, polyethylene terephthalate, polycarbonate, polystyrene, polyurethane, polyethylene, and polypropylene.

Here, the term "recording medium having low absorption" or "recording medium having non-absorption" represents a recording medium having a water absorbing amount which is equal to or less than 10 mL/m$^2$ during the time up to 30 msec from the start of contact based on a Bristow method. The Bristow method is a method which is most widely used as a method of measuring a liquid absorption amount in a short time, and is also used in Japanese Technical Association of the Pulp and Paper Industry (JAPAN TAPPI). The specification of a test method is disclosed in No. 51 "Paper and paperboard-liquid absorbency test method-Bristow method" of "JAPAN TAPPI paper pulp test method 2000 Edition".

2. Examples

Hereinafter, the invention will be further specifically described with reference to Examples and Comparative Examples. However, note that the invention is not limited to Examples.

2.1. Preparation of Aqueous Ink Composition for Ink Jet Recording

Before performing the respective types of evaluations, an aqueous ink composition for ink jet recording (hereinafter, simply referred to as an "ink composition") was prepared as an example of the liquid composition at first. Materials which are mainly used for the ink composition in the following Examples and Comparative Examples are as indicated in Table 1 below.

(2) Second Solvent
  1,2-Hexanediol (log P: 0.7)
  1,2-pentanediol (log P: 0.01)
  Butyltriglycol (log P: 0.02)
  Ethyltriglycol (log P: −0.98)
(3) Pentaerythritol (log P: −2.36)
(4) Coloring material
  Carbon black MA77 (product name: manufactured by Mitsubishi Chemical Corporation, black pigment)
  Direct blue 199 (BASACID blue NB748, product name: BASF Corporation, cyan dye)
(5) Humectants
  Propylene glycol
  Glycerin
  Trimethylolpropane

TABLE 1

| Composition and addition amount of ink composition (mass %) | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| First solvent | Pentaerythritol caprylate (logP: 2.29) | 0.005 | — | — | — | — | — | 0.8 | — | — |
| | Heptanoic acid 3-hydroxy-2,2-bis (hydroxymethyl) propyl (logP: 0.46) | — | 0.2 | — | — | — | — | — | — | — |
| | Ditrimethylolpropane (logP: 0.21) | — | — | 0.5 | — | 0.5 | — | — | 0 | — |
| | Tritrimethylolpropane (logP: 0.97) | — | — | — | 0.05 | — | 0.1 | — | — | 0.1 |
| Second solvent | 1,2-Hexanediol (logP: 0.7) | — | — | — | 5 | — | — | — | — | — |
| | 1,2-pentanediol (logP: 0.01) | — | 8 | — | — | — | 8 | — | — | 0 |
| | Butyltriglycol (logP: 0.02) | 5 | — | — | — | 5 | — | 3 | — | — |
| | Ethyltriglycol (logP: −0.98) | — | — | 15 | — | — | — | — | 15 | — |
| Pentaerythritol (logP: −2.36) | | — | — | — | — | — | — | — | 0.5 | 8 |
| Coloring material | Carbon black MA77 | 6 | 6 | 6 | 6 | — | — | 6 | 6 | — |
| | Direct blue 199 | — | — | — | — | 4 | 4 | — | — | 4 |
| Humectants | Propylene glycol | — | — | 5 | 15 | — | — | — | 5 | — |
| | Glycerin | 10 | 12 | — | — | 15 | 15 | 10 | — | 15 |
| | Trimethylolpropane | 5 | — | — | — | 5 | 3 | 5 | — | 3 |
| Surface tension adjusting agent | BYK-348 | 1.5 | 1.5 | 1.5 | 1.5 | — | — | 1.5 | 1.5 | — |
| | OLFINE E1010 | — | — | — | — | 1.2 | 1.2 | — | — | 1.2 |
| pH adjusting agent | Triisopropanolamine | 0.2 | 0.2 | 0.2 | 0.2 | 0.5 | 0.5 | 0.2 | 0.2 | 0.5 |
| Resin | Acrylic acid ester-methacrylic acid resin | 1.5 | 1.5 | 1.5 | 1.5 | — | — | 1.5 | 1.5 | — |
| | Pure water | Remainder | Remainder | Remainder | Remainder | Remainder | Remainder | Remainder | Remainder | Remainder |

The respective ink compositions were obtained in such a manner that the respective components were mixed and stirred so as to be a composition indicated in Table 1, and then were filtered through a membrane filter having a 5 μm of hole diameter. Note that, in Table 1, a unit of a numerical value is mass %, and the total thereof is 100.0 mass %.

Note that, the components used in Table 1 are as follows, and the log P values in Table 1 are calculated through the method disclosed in OECD Test Guideline 107.

(1) First Solvent
  Pentaerythritol caprylate (log P: 2.29)
  Heptanoic acid 3-hydroxy-2,2-bis (hydroxymethyl) propyl (log P: 0.46)
  Ditrimethylolpropane (log P: 0.21)
  Tritrimethylolpropane (log P: 0.97)

(6) Surface Tension Adjusting Agent
  BYK-348 (silicone surfactant, manufactured by BYK Japan KK)
  OLFINE E1010 (acetylene glycol surfactant, manufactured by Air Products and Chemicals, Inc.)
(7) pH Adjusting Agent
  Triisopropanolamine
(8) Resin
  Acrylic acid ester-methacrylic acid resin (JONCRYL 682, product name: manufactured by BASF Corporation)

2.2. Evaluation of Ink Composition

2.2.1. Test for Antiseptic Performance

The number of viable cells is measured in such a manner that the respective test bacteria (bacteria and fungi) were inoculated with each other in the respective ink compositions obtained in Examples and Comparative Examples so as to be approximately $10^5$ CFU/g, and were left to stand for 24 hours at 25° C. The measurement result is evaluated on the basis of the following evaluation criteria.

Types of Test Bacteria
   *Escherichia coli*
   *Pseudomonas aeruginosa*
   *Aspergillus oryzae*
   *Penicillium funiculosum*

Evaluation Criteria
   Initial stage: 100,000 CFU/g
   A: less than 100 CFU/g
   B: equal to or greater than 100 CFU/g and less than 1,000 CFU/g
   C: equal to or greater than 1,000 CFU/g and less than 10,000 CFU/g
   D: equal to or greater than 10,000 CFU/g 2.2.2. Test for Low Temperature Stability The respective ink compositions in Examples and Comparative Examples were put into a sample bottle, left to stand for 1 week at −20° C., and then the ink compositions were filtered so as to collect low-temperature precipitates. The low temperature stability of the ink composition was evaluated on the basis of the appearance of the ink compositions and the number of the low-temperature precipitates. Evaluation criteria are as follows.

Evaluation Criteria
   A: less than 50 low-temperature precipitates per 1 mL
   B: equal to or greater than 50 low-temperature precipitates per 1 mL and less than 200 low-temperature precipitates per 1 mL
   C: equal to or more than 200 low-temperature precipitates per 1 mL
   D: separation of oil droplets and the like occurred in ink composition 2.2.3. Test for Discharge Stability An ink jet type printer EM-930C ((product name) manufactured by Epson) was filled with the respective ink compositions which are obtained in Examples and Comparative Examples, 20 pages were continuously printed while discharging all of the nozzles in a row a thermostatic tank at 40° C., and then the number of nozzles having dot omission and flight curvature in printing were evaluated on the basis of the following criteria.

Evaluation Criteria
   A: 0 nozzle having dot omission and flight curvature
   B: 1 to 5 nozzles having dot omission and flight curvature
   C: 6 or more nozzles having dot omission and flight curvature The result of the evaluation test will be indicated in Table 2 below.

activity was exhibited. In addition, also in Comparative Examples 1 and 3 which contain the first solvent, strong antibacterial activity and antifungal activity were exhibited similar to Examples 1 to 6. In contrast, in Comparative Example 2 which does not contain the first solvent, but contains pentaerythritol instead of the first solvent, the log P value of pentaerythritol is low, and thus the number of the viable cells was not reduced that much compared with Examples 1 to 6, and it was not possible to obtain sufficient antiseptic performance. In this way, the ink compositions obtained in Examples 1 to 6 contain the first solvent which has high log P value, and thus could exhibit the strong antibacterial activity and antifungal activity, and obtain a high antiseptic effect even with a small amount without using the antibacterial agent having the biocidal activity or the antifungal agent in the related art.

As a result of the low temperature stability, in Examples 1 to 6, the separation of the low-temperature precipitate or oil droplets was not observed, the low temperature stability was high. In addition, in Comparative Example 2 which does not contain the first solvent, the low temperature stability was exhibited similar to Examples 1 to 6, whereas in Comparative Examples 1 and 3 which contain only the first solvent having high log P value and high hydrophobicity, the separation of oil droplets was found, and the low temperature stability was not exhibited that much compared with Examples 1 to 6.

As a result of the discharge stability, in Examples 1 to 6, the number of nozzles which have the dot omission and the flight curvature was 0, and high discharge stability was exhibited. In addition, in Comparative Example 2 which does not contain the first solvent, discharge stability similar to Examples 1 to 6 was exhibited, whereas in Comparative Examples 1 and 3 which contain only the first solvent, the nozzles which have the dot omission and the flight curvature were found, and discharge stability was not exhibited that much compared with Examples 1 to 6.

As such, in Comparative Example 1 in which the more than 0.5 mass % of first solvent was added, the oil droplets were separated due to the insufficient dissolving force by the second solvent, and thus low-temperature stability was deteriorated. Further, the oil droplets cause discharging properties to be deteriorated and thus the discharge stability was also deteriorated. In addition, with respect to Example 6, in Comparative example 3 in which 1,2-pentanediol which is the second solvent is replaced with pentaerythritol, since the log P value of pentaerythritol is low, and it was not

TABLE 2

| Evaluation test | | Example 1 | Example 2 | Example 3 | Example 4 | Example 5 | Example 6 | Comparative Example 1 | Comparative Example 2 | Comparative Example 3 |
|---|---|---|---|---|---|---|---|---|---|---|
| Test for antiseptic performance | *Escherichia coli* | A | A | A | A | A | A | A | C | A |
| | *Pseudomonas aeruginosa* | A | A | A | A | A | A | A | C | A |
| | *Aspergillus oryzae* | A | A | A | A | A | A | A | C | A |
| | *Penicillium funiculosum* | A | A | A | A | A | A | A | C | A |
| Test for low temperature stability | | A | A | A | A | A | A | D | A | C |
| Test for discharge stability | | A | A | A | A | A | A | C | A | B |

As a result of the test for the antiseptic performance, in Examples 1 to 6, in every test bacteria of aerobic bacteria, anaerobic bacteria, and fungi, the number of the viable cells was reduced to less than 0.1%, and strong bactericidal possible to obtain the compatibility with the first solvent, the first solvent was easily separated at a low temperature, and the low temperature stability and the discharge stability were deteriorated.

As described above, according to the invention, it is possible to obtain the antiseptic properties of the ink without using the antibacterial agent having the biocidal activity or the antifungal agent in the related art, and it is possible to obtain the ink which is safe without a risk of skin sensitization, is excellent in the low temperature stability and the discharge stability.

The present invention is not limited to the above embodiments, and various modifications are possible. For example, the invention includes configurations substantially the same as the configurations described in the embodiments (for example, a configuration having the same function, method, and result, or a configuration having the same purpose and effect). The invention also includes a configuration that replaces non-essential parts of the configuration described in the embodiments. The invention also includes a configuration that can exhibit the same action and effect or a configuration that can achieve the same purpose as those of the configuration described in the embodiment. The invention also includes a configuration obtained by adding a known technique to the configuration described in the embodiment.

The entire disclosure of Japanese Patent Application No. 2015-074878, filed Apr. 1, 2015 is expressly incorporated by reference herein.

What is claimed is:

1. A liquid composition comprising:
   a first solvent that is a polyol compound which has a distribution coefficient of water-octanol in a range of 0.0 to 2.5, and has three or more hydroxyl groups;
   a second solvent that is an organic solvent having a distribution coefficient of water-octanol which is in a range of −1.0 to 1.0;
   water; and
   a coloring material,
   wherein a content of the first solvent is in a range of 0.005 mass % to 0.5 mass %, and
   wherein a content of the second solvent is in a range of 0.5 mass % to 15 mass %.

2. The liquid composition according to claim 1,
   wherein the polyol compound is at least one selected from the group consisting of a triol compound and a derivative thereof.

3. The liquid composition according to claim 1,
   wherein the polyol compound is at least one selected from the group consisting of heptanoic acid 3-hydroxy-2,2-bis (hydroxymethyl) propyl, pentaerythritol caprylate, sorbitan monocaprate, ditrimethylolpropane, and tritrimethylolpropane.

4. The liquid composition according to claim 1,
   wherein the second solvent is at least one selected from the group consisting of 1,2-alkyl diols and glycol ethers.

5. The liquid composition according to claim 4,
   wherein the 1,2-alkyl diols are at least one selected from the group consisting of 1,2-butanediol, 3,3-dimethyl butane-1,2-diol, 1,2-pentanediol, 1,2-hexanediol, and 1,2-heptanediol.

6. The liquid composition according to claim 4,
   the glycol ethers are at least one selected from the group consisting of ethyltriglycol, dipropylene glycol monomethyl ether, butyltriglycol, butyldiglycol, and dipropylene glycol monopropyl ether.

7. The liquid composition according to claim 1,
   wherein the content of the water is equal to or greater than 40 mass %.

8. A pigment dispersion liquid comprising the liquid composition according to claim 1.

9. A pigment dispersion liquid comprising the liquid composition according to claim 2.

10. A pigment dispersion liquid comprising the liquid composition according to claim 3.

11. A pigment dispersion liquid comprising the liquid composition according to claim 4.

12. A pigment dispersion liquid comprising the liquid composition according to claim 5.

13. A pigment dispersion liquid comprising the liquid composition according to claim 6.

14. A pigment dispersion liquid comprising the liquid composition according to claim 7.

15. An aqueous ink composition for ink jet recording comprising the liquid composition according to claim 1.

16. An aqueous ink composition for ink jet recording comprising the liquid composition according to claim 2.

17. An aqueous ink composition for ink jet recording comprising the liquid composition according to claim 3.

18. An aqueous ink composition for ink jet recording comprising the liquid composition according to claim 4.

19. An aqueous ink composition for ink jet recording comprising the liquid composition according to claim 5.

20. An aqueous ink composition for ink jet recording comprising the liquid composition according to claim 6.

* * * * *